(12) United States Patent
Bertrand

(10) Patent No.: US 7,770,444 B2
(45) Date of Patent: Aug. 10, 2010

(54) PATCH FOR FIXING AN ELECTRONIC SYSTEM TO A TIRE

(75) Inventor: David Bertrand, Besancon (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 889 days.

(21) Appl. No.: 11/610,255

(22) Filed: Dec. 13, 2006

(65) Prior Publication Data

US 2007/0175554 A1 Aug. 2, 2007

Related U.S. Application Data

(60) Provisional application No. 60/765,647, filed on Feb. 6, 2006.

(30) Foreign Application Priority Data

Dec. 13, 2005 (FR) .................................. 05 12724

(51) Int. Cl.
*B60C 23/02* (2006.01)
(52) U.S. Cl. ...................... 73/146.5; 340/442
(58) Field of Classification Search .................. None
See application file for complete search history.

(56) References Cited

U.S. PATENT DOCUMENTS

| | | | | |
|---|---|---|---|---|
| 6,388,567 B1 * | 5/2002 | Bohm et al. | ................. | 340/442 |
| 6,462,650 B1 | 10/2002 | Balzer et al. | ................. | 340/442 |
| 6,653,936 B2 * | 11/2003 | Bohm et al. | ................. | 340/442 |
| 6,666,079 B2 | 12/2003 | Poulbot et al. | ................. | 73/146 |
| 7,275,427 B1 | 10/2007 | Martin | ........................ | 73/146 |
| 7,353,720 B2 * | 4/2008 | Sinnett | ................. | 73/862.474 |
| 2002/0093421 A1 * | 7/2002 | Bohm et al. | ................. | 340/442 |
| 2003/0056579 A1 | 3/2003 | Poulbot et al. | ................. | 73/146 |
| 2003/0089451 A1 * | 5/2003 | Koch | ......................... | 156/245 |
| 2005/0076982 A1 | 4/2005 | Metcalf et al. | ........... | 152/152.1 |
| 2005/0076992 A1 | 4/2005 | Metcalf et al. | | |
| 2005/0126668 A1 | 6/2005 | Fornerod et al. | ......... | 152/152.1 |
| 2005/0217774 A1 | 10/2005 | Borot | ...................... | 152/152.1 |
| 2006/0006728 A1 * | 1/2006 | Sinnett | ...................... | 301/5.1 |
| 2006/0237109 A1 | 10/2006 | Mangold et al. | ......... | 152/152.1 |
| 2007/0013503 A1 * | 1/2007 | Chien et al. | ................. | 340/447 |
| 2009/0058667 A1 * | 3/2009 | Dixon et al. | ................. | 340/626 |
| 2009/0167518 A1 * | 7/2009 | Koch | ......................... | 340/447 |

FOREIGN PATENT DOCUMENTS

| | | |
|---|---|---|
| DE | 199 40 086 A1 | 8/1999 |
| DE | 102 55 138 A1 | 11/2002 |
| EP | 1 275 949 A1 | 1/2003 |
| WO | WO 03/076216 A1 | 9/2003 |
| WO | WO 2007/048621 A1 | 5/2007 |

* cited by examiner

*Primary Examiner*—Andre J Allen
(74) *Attorney, Agent, or Firm*—Fitzpatrick, Cella, Harper & Scinto

(57) ABSTRACT

A patch configured to fix an electronic system, which includes a sensor, to a tire. The patch has a foot with a surface configured to be fixed to the tire. The foot has at least two portions connected to one another by at least one bridging element. The bridging element has, in a section which is parallel to the surface of the foot that is configured to be fixed to the tire, a surface area which is smaller than the overall surface area in the same section between the connected portions of the foot. In the same section, the bridging element continuously connects the connected portions of the foot.

22 Claims, 6 Drawing Sheets

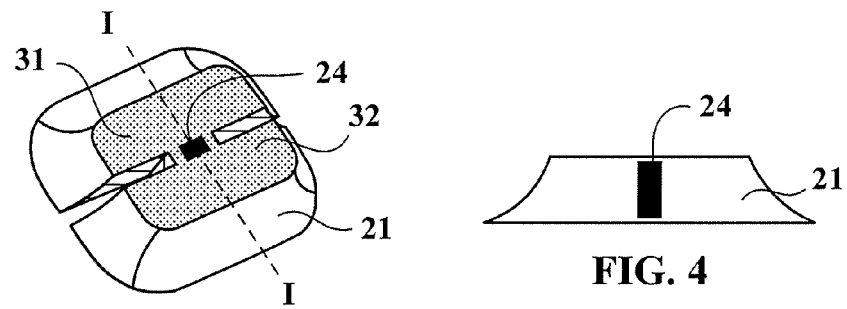
FIG. 3
FIG. 4
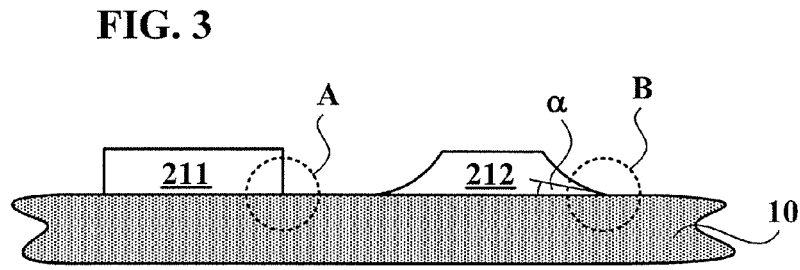
FIG. 5
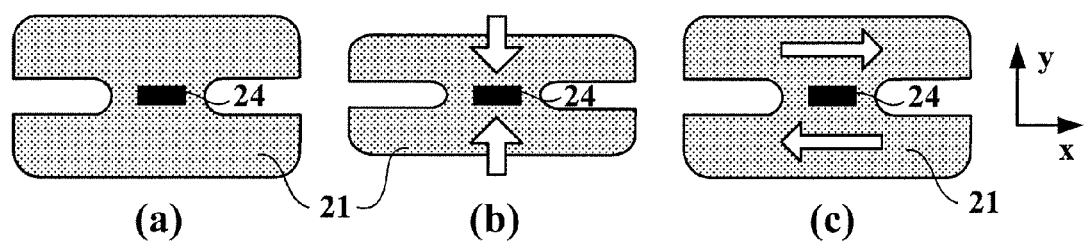
FIG. 6
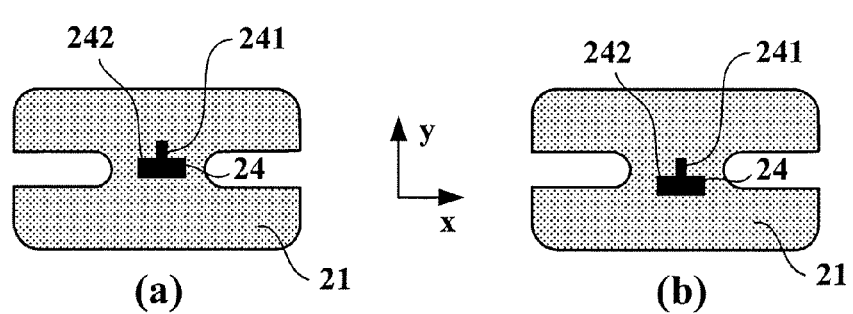
FIG. 7

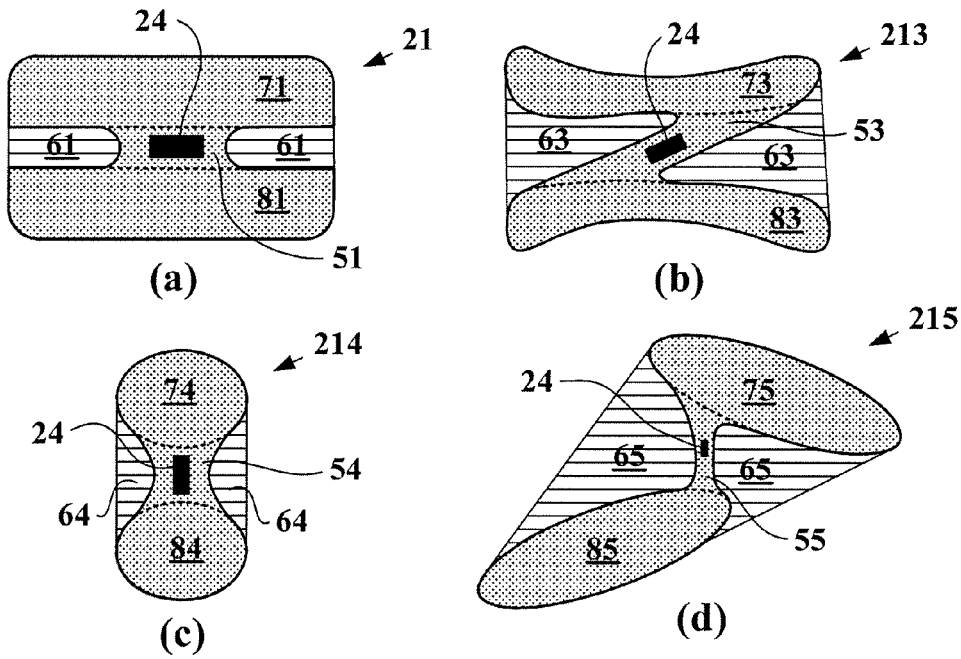
FIG. 11
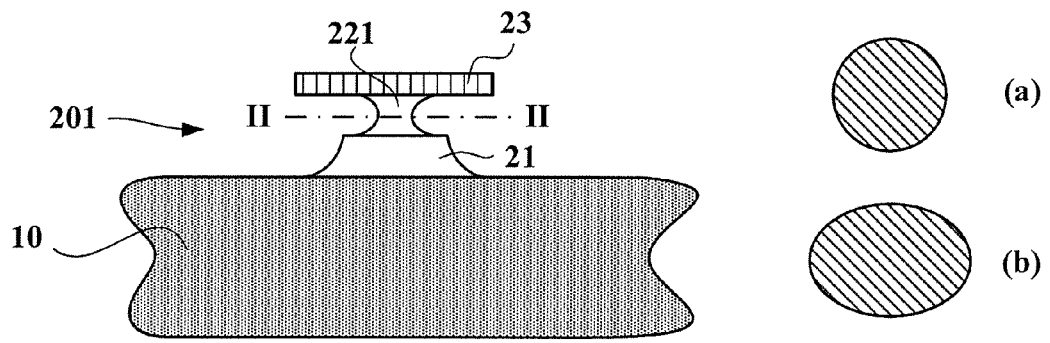
FIG. 12
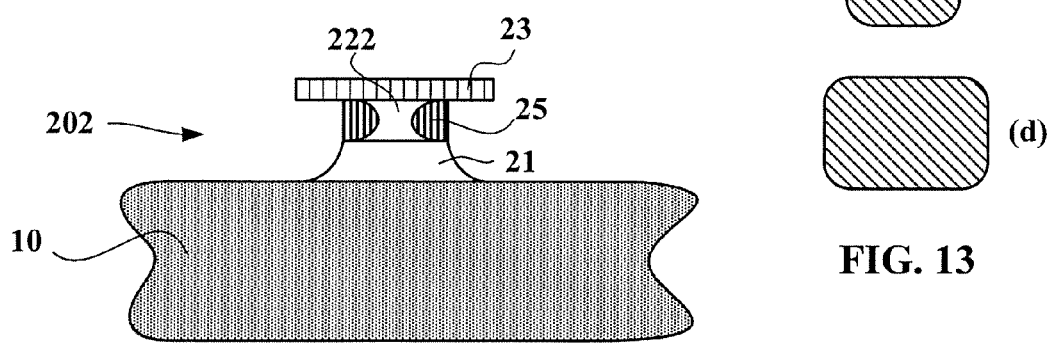
FIG. 14
FIG. 13

PATCH FOR FIXING AN ELECTRONIC SYSTEM TO A TIRE

CROSS-REFERENCE TO RELATED APPLICATION

This application claims the benefit of U.S. Provisional Application No. 60/765,647, filed Feb. 6, 2006, which is incorporated herein by reference in its entirety.

BACKGROUND OF THE INVENTION

1. Field of the Invention

The present invention relates to means of fixing electronic systems to a tire. Here, the term "tire" refers to any type of elastic casing, whether it is under internal pressure when it is in use or not.

2. Description of Related Art

It is known to use electronic systems to monitor certain parameters of a tire, for example the inflation condition, the inflation pressure or the temperature of the tire. If the electronic system is to be fixed to the tire, several means of fixing may be considered. Some known means use a connecting element of flexible material, intended to act as an interface between the tire (which is flexible) and the electronic system (which is rigid). In the text below, this connecting element will be called a "patch".

The patch can fulfill a number of functions, two of which are particularly important: it fixes the electronic system to the tire, and it protects it from the deformations undergone by the tire.

By way of example, documents U.S. Pat. No. 6,462,650, WO 03/076216, US 2005/0076982 and US 2005/0076992 disclose a patch glued to the inner surface of the tire. The flexibility of the patch, which results from the material selected therefor and its geometry (see in particular US 2005/0126668), makes it possible to prevent the electronic system from being deformed and to limit the stresses transmitted thereto; this decoupling contributes to extending its operative life. More patches aiming at mechanical decoupling of electronic systems from tires are disclosed in DE 199 40 086, US 2005/076992 and US 2006/0237109.

Another known means of fixing an electronic system consists in sliding it into a kind of "pocket" made in the tire previously. US 2005/0217774 describes a solution of this kind. This configuration has the advantage of eliminating the phase of gluing the patch. It can be used, in particular, for systems for measuring pressure and temperature.

Another means of fixing comprises a patch which is designed not to completely isolate the electronic system or the sensitive part thereof from the tire but, in contrast, to amplify the deformations or rates of deformation to which a sensitive element of the electronic system is subjected. This is the case, for example, in onboard power generation systems such as a system in which a piezoelectric film is connected to the tire by way of a structure which amplifies certain deformations or the rates of deformation. US 2006/006728 is an example of such a patch

SUMMARY OF THE INVENTION

In some applications requiring the presence of an electronic system associated with a tire and, for example, monitoring deformations in the tire, it is crucial to make a reliable, reproducible connection between a sensitive element (the sensor) of the electronic system and the tire itself. Thus, the coupling between the tire and the sensor has to be managed properly while allowing decoupling of the tire and the electronic system.

Moreover, where it is necessary to measure deformations or stresses in a plurality of directions, a patch which has the appropriate structure, constituent materials and/or geometry may be used to adapt transmission of the deformations or stresses in the various directions in order to make them compatible with the sensitivity of the sensor and to allow high-quality measurement with a good signal-to-noise ratio.

To ensure durability of the gluing of the patch to the tire, it is important to take into account the stresses which arise at the interface between the patch and the tire. The patch is therefore designed to allow the stresses and/or deformations to be properly transmitted to the sensitive element of the sensor, while causing the minimum stress at its interface with the tire.

A patch according to the invention is able to fulfill the following functions: (i) fixing the electronic system to the tire; (ii) effectively transmitting deformations which the tire undergoes to the sensor, including balancing the sensitivities in the case of multi-dimensional measurement; (iii) limiting the stresses generated at the interface between the patch and the tire; and (iv) limiting the stresses and deformations transmitted to the electronic system. Transmission of the stresses to the sensor thus has to be maximized while minimizing the stresses arising at the interface between the patch and the tire.

The invention meets the need to perform and monitor all the functions detailed above, so that it is possible to fix to a tire an electronic system which measures the deformation and/or stresses intimately connected with deformations of the tire.

This object is achieved by a patch for fixing an electronic system to a tire, the patch having a foot with a surface configured to be fixed to the tire. The foot has at least two portions connected to one another by at least one bridging element. The bridging element has, in a section which is parallel to the surface of the foot that is configured to be fixed to the tire, a surface area which is smaller than the overall surface area in the same section between the connected portions of the foot. In this same section, the bridging element continuously connects the connected portions of the foot. In other words, the connected portions of the foot and the bridging element are configured such that a section taken parallel to the surface of the foot that is configured to be fixed to the tire will include the connected portions of the foot and the bridging element, with the bridging element extending continuously between and connecting these portions of the foot (e.g., as shown in FIGS. 3, 6, 7, 9, 10, 11, and 18).

The term "foot" is used by those skilled in the art to refer to a connecting element comprising portions configured to provide contact with the tire. The foot is configured to carry, directly or indirectly (i.e., via a support), an electronic system. The term "bridging element" refers to a part of the foot which connects the portions configured to provide contact with the tire. The bridging element may also have a surface configured to be in contact with the tire, but this is not necessarily the case. Preferably, there is at least one direction in which the dimension of the bridging element is smaller than the corresponding dimension of the portions of the foot that are connected by the bridging element.

For simple geometries it is easily understood what the "surface area between the portions of the foot" in a given section means. FIG. 18 illustrates how this surface area is to be obtained if more complex geometries are involved The definition of a patch according to the invention involves "a section which is parallel to the surface of the foot that is configured to be fixed to the tire". The surface of the foot that is configured to be fixed to the tire is not necessarily flat, but in certain embodiments may be flat. In this case the geometry of the patch is considered in a plane that is parallel to the surface of the foot that is configured to be fixed to the tire.

In one embodiment, the maximum height of the bridging element, in a direction perpendicular to the surface of the foot that is configured to be fixed to the tire, is equal to or smaller than the maximum height of at least one of the foot portions that it connects, and its volume is smaller than the overall volume extending between the two foot portions. For more complex geometries, the volume extending between the two portions is determined in analogy to the determination of the surface area between the portions of the foot described above.

Preferably, the surface area of the bridging element in a section which is parallel to that surface of the foot configured to be fixed to the tire is less than about 30% of the overall surface area, in the same section, between the portions of the foot connected by the bridging element.

Preferably, the bridging element has, in any section which is parallel to the surface of the foot configured to be fixed to the tire, a surface area which is smaller than the overall surface area, in the same section, between those portions of the foot which are connected by the bridging element. Preferably, the surface area of the section of the bridging element in any section parallel to the surface of the foot configured to be fixed to the tire is less than about 30% of the overall surface area, in the same section, between those portions of the foot which are connected by the bridging element.

In certain embodiments a thickness of the bridging element may be the same as a thickness of the portions of the foot connected by the bridging element, as measured in a direction perpendicular to the surface of the foot configured to be fixed to the tire. In other embodiments, a thickness of the bridging element is less than a thickness of the portions of the foot connected by the bridging element, as measured in a direction perpendicular to the surface of the foot configured to be fixed to the tire.

According to one embodiment, the foot has, in a section which is parallel to the surface of the foot configured to be fixed to the tire, the shape of an H. This allows the stresses which the two bars of the H undergo to be concentrated in the bridging element joining the two bars. According to another embodiment, the foot has, in a section which is parallel to the surface of the foot configured to be fixed to the tire, the shape of a Z. The H shape has the advantage that it is more symmetrical, which makes it easier to interpret the signals; by contrast, the Z shape allows shearing in the two directions parallel to the bars to be differentiated. When an H-shaped or Z-shaped patch is fixed to a tire, the direction in which the bars are oriented may be adapted to the deformations to be measured; they may be oriented radially (that is to say in a plane including the axis of rotation of the tire) or in the peripheral direction, or in any intermediate direction.

The foot may be made of one or more materials, of rubber or otherwise. Preferably, the two portions of the foot are made of a material which is flexible but of low extensibility, which allows for better transmission of the stresses to the bridging element. It is also possible to improve transmission by reinforcing portions of the foot with reinforcing elements. It is moreover advantageous to surround the sensor with a small volume of more rigid material.

The patch may moreover comprise a support which is separate from the foot and is configured to carry an element of the electronic system other than the sensor, such that there is no direct contact between the foot and this element. This is particularly advantageous if the electronic system has elements which have to be protected from deformations and/or stresses which the bridging element undergoes. According to one embodiment, the support comprises means of isolating these elements of the electronic system from the stresses and deformations which the foot undergoes.

This isolation may be achieved by selecting the materials and/or geometric shapes of the support appropriately, the objective being to reduce the stiffness at constant rigidity. This may be done by means of a narrowing in the support with respect to a direction perpendicular to that surface of the foot configured to be fixed to the tire, with the narrowing located, along this direction, between the foot and this element of the electronic system. The more the narrowing reduces the contact section, the less the stresses are transmitted: if the support narrowed to a point the stresses would no longer be transmitted at all. Moreover, it may be advantageous to fill up the free space left by the narrowing with a low-rigidity compressible material so that the degree of freedom of movement of the end of the foot is restricted without in any way making the foot rigid, and so that the vibration characteristics are optimized (damping and dissipating aspects).

To extend the operative life of the system formed by the tire and the patch, it is advantageous to select a geometry for the foot such that, when the patch is fixed to a tire, the angle between (i) the interface surface between the patch and the tire and (ii) the tangent to the free surface (that is to say the surface that is not fixed to the tire) of the foot at any point on the contour of the interface surface between the patch and the tire is less than about 90°, preferably even less than about 45°. In this way, the concentration of stresses which, among other things, may lead to crack initiation, is reduced as far as possible.

The invention also relates to an assembly including an electronic system having a sensor and a patch according to the invention. The sensor is coupled mechanically to the bridging element of the foot of the patch.

According to one embodiment, the patch has an axis of symmetry perpendicular to that surface of the foot configured to be fixed to the tire, and the electrical connection between the sensor and an isolated element of the electronic system is provided by a conductive wire extending substantially along this axis. This positioning of the conductive wire in particular allows mechanical stress on the wire to be reduced when the patch is flexed. When the patch is also stressed by being extended, it is preferable to make the electrical connection between the sensor and the at least one element of the electronic system by way of an extensible conductor such as a helical spring centered on this axis.

The assembly according to the invention is preferably used with a sensor allowing normal stresses and/or shear stresses to be measured in three directions. The invention also relates to a tire having an assembly of this kind.

BRIEF DESCRIPTION OF THE DRAWINGS

The invention will be more clearly appreciated from the description of the drawings, in which:

FIG. 3 shows, diagrammatically, a perspective view of an H-shaped support according to the invention;

FIG. 4 shows, diagrammatically, a section along the line I-I of the support in FIG. 3;

FIG. 5 shows, diagrammatically, a partial sectional view of two patches;

FIG. 6 shows, diagrammatically, a top view of a patch according to the invention, subjected to different types of stress;

FIG. 7 shows, diagrammatically, a top view of two patches according to the invention;

FIGS. 9 to 11 show, diagrammatically, sectional views, in a section parallel to the surface of the tire, of patches according to the invention;

FIG. 12 shows, diagrammatically, a partially sectional view of a patch according to the invention, the section plane comprising the axis of symmetry of the patch;

FIG. 13 shows, diagrammatically, sections along the line II-II of a number of variants on the support in FIG. 12;

FIGS. 14 to 16 show, diagrammatically, partially sectional views of patches according to the invention.

These figures are provided purely for the sake of illustration, and are not restrictive in any way.

DETAILED DESCRIPTION OF THE INVENTION

Figure 1:
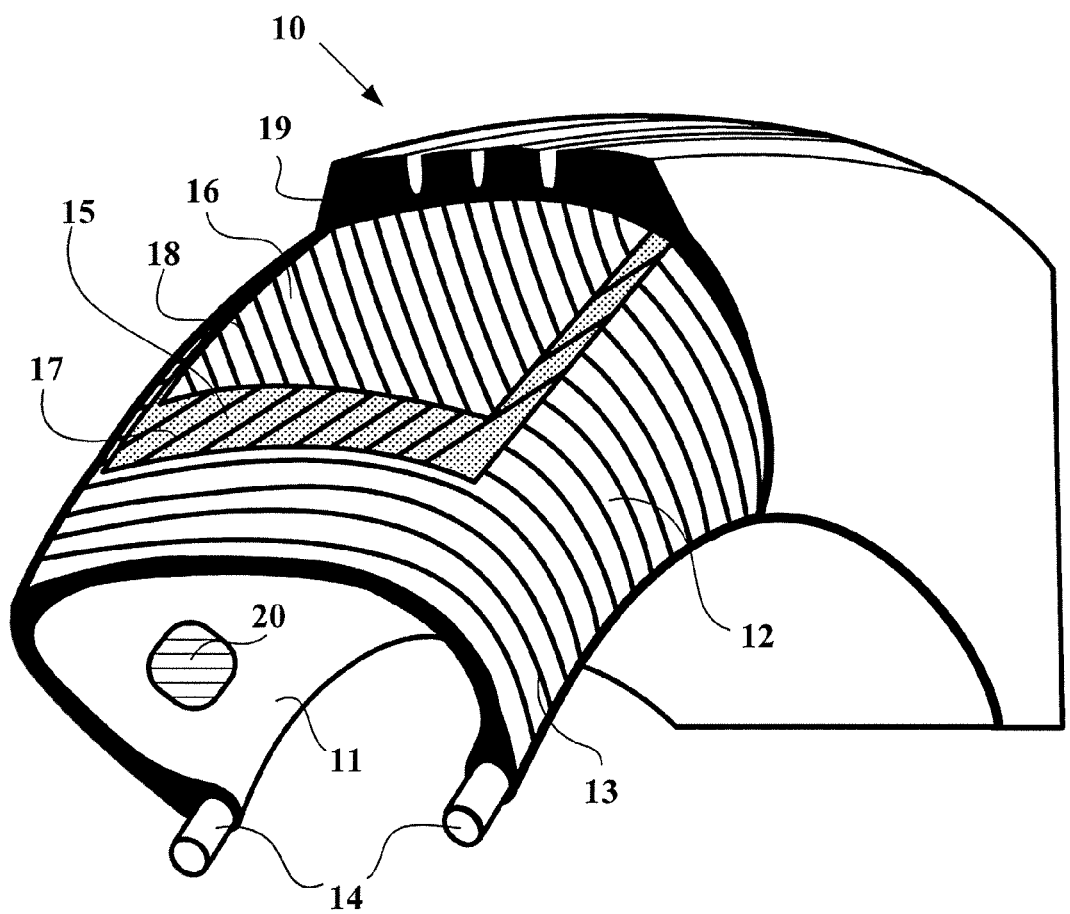
FIG. 1 shows, diagrammatically, a partial perspective view of a tire provided with a patch.

FIG. 1 shows, diagrammatically, a traditional tire 10, comprising an inner-liner 11 of impermeable rubber, a carcass ply 12 formed by cords 13 coated with rubber mix (that is to say a rubber composition including at least one elastomer and one filler), circumferential reinforcements 14 which keep the tire 10 on the rim (not shown), and a crown reinforcement comprising two plies 15, 16. Each of the plies 15 and 16 is reinforced by cords 17 and 18 which are at an angle with respect to a plane perpendicular to the axis of rotation of the tire. A tread 19 is positioned on the plies 15 and 16; it is this tread 19 which provides the contact between the tire 10 and the road. The tire is equipped with a patch 20 whereof the structure is illustrated in the figures below.

Figure 2:
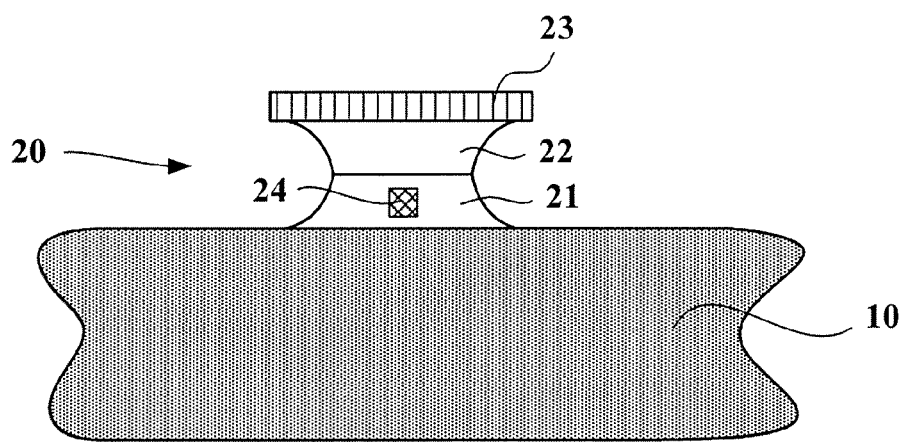
FIG. 2 shows, diagrammatically, a partially sectional view of a patch according to the invention.

FIG. 2 shows, diagrammatically, a partially sectional view of a patch 20 according to the invention, glued to a tire 10, for example to part of the internal rubber 11 (FIG. 1). The patch 20 has a foot 21 and a support 22 carrying a plate 23 which contains an electronic system. A sensor 24 is located inside the foot 21.

The foot 21 allows the patch 20 to be fixed to the tire 10 and to transmit to the sensor 24 deformations and stresses which the tire 10 undergoes. The support 22 fulfills a number of functions. First, it makes it possible to fix the plate 23 and hence the electronic system to the tire. Second, it ensures that there is a mechanical decoupling of the plate 23 and the foot 21. This decoupling makes it possible to use a plate 23 which is capable of little or no deformation and is compatible with the mechanical conditions required for the electronics. Third, it makes it possible to provide an electrical connection between the sensor 24 and the electronic system carried by the plate 23.

Where the electronic system is miniaturized to a sufficient extent to be integrated or mounted on or against the sensor 24, the patch 20 may not include a support 22.

Since the foot 21 and the support 22 fulfill different functions, it may be advantageous to use different materials or assemblies of materials for the foot 21 and the support 22. In the present embodiment, the foot 21 and the support 22 are made of rubber mixes of suitable rigidity. If different materials are used (though this is not restrictive), the foot 21 and the support 22 may be assembled before or after the foot 21 is fixed to the tire 10. The plate 23 may be made in one piece with the support 22 before or after the other assembly operations have been carried out (assembly of the two parts comprising foot and support, or assembly of the foot to the tire). This flexibility with respect to the order in which assembly is performed provides advantageous degrees of freedom to make manufacture easier.

In the present embodiment, the interface between the foot 21 and the support 22 is planar. This is a particular characteristic, but the invention is not restricted to this type of interface. The interface may be non-existent if the materials forming the two parts are identical and are made all in one piece, or this interface may take different forms, for example in order to improve its behavior under force or over time.

The sensor 24 may in particular be sensitive to the stresses applied to it. It may for example make it possible to measure normal stresses or shear stresses in three directions. A number of examples of this type of sensor are described in EP 1 275 949, which is incorporated herein by reference.

If the sensor 24 is designed to be sensitive to stress, the foot 21 must ensure that deformations of the tire are converted to stresses, and that these stresses are concentrated in the sensitive part of the sensor. The solution proposed in this embodiment uses an H-shaped structure, shown diagrammatically in perspective in FIG. 3. FIG. 4 shows the same foot 21 in section, in the direction of the line I-I (FIG. 3).

An H-shaped structure has the following advantages. First, it allows the stresses brought about by deformations to be concentrated on the bridging element which connects the two bars 31 and 32 of the H, that is to say the location selected for the position of the sensor 24. Second, it allows the apparent stiffness of the patch to be limited, while maintaining good transmission of the stresses. Hence the stresses developed at the interface with the tire when this interface is deformed are limited. Small interface stresses allow good conditions to be established for durability of the glue holding the foot on the tire. This also allows the influence of the presence of the patch on deformations of the tire to be limited. Third, it maintains a large contact surface between the foot and the tire, which further limits the intensity of the interface stresses.

The geometry of the foot 21 plays an important role in whether the overall arrangement behaves properly over time. If sharp corners are avoided and rounded transitions are provided, it is possible to significantly reduce the concentration of stresses which, among other things, may lead to crack initiation. This is particularly true along the circumference of the foot, where the local rigidity of the foot is reduced.

FIG. 5 illustrates this finding. It shows in partial section two feet 211 and 212 fixed to a tire 10. In the case of the foot 211, the stresses generated at the corner (zone A) are considerable and may cause the tire 10 to tear in this zone, especially if the material forming the tire 10 in this zone (for example the rubber mix of the internal rubber) is less rigid that that of the foot 211. By contrast, the foot 212 has a geometry such that the risk of crack initiation in the zone B is reduced. One way of achieving this result is to reduce the thickness of the foot progressively, but other ways of arriving at the same result may be envisaged, for example a progressive reduction in the rigidity of the material. It can be seen that the angle alpha ($\alpha$) between: (i) the interface surface between the patch and the tire 10; and (ii) the tangent to the free surface (that is to say the surface not fixed to the tire) of the foot 212 at the contour of the interface surface between the patch and the tire 10 is less than about 45°.

Thanks to the H shape of the foot 21, the latter can transmit to the sensor 24 the stresses resulting from deformations of the support to which it is fixed. FIG. 6 shows, in a top view, a patch according to an embodiment of the invention which is stressed in accordance with the two main modes of transmission. The foot 21 is at rest in FIG. 6(a). In FIG. 6(b), it is compressed along the axis y and transmits a compressive force to the sensor 24. If the structure were stretched in the direction y, the stress generated would be of the opposite sign. In FIG. 6(c), the foot 21 undergoes a shearing action xy. It generates a corresponding shearing force at the sensor 24. With this type of stress, the H shape allows to maintain low shear rigidity as compared to other, more solid structures. The transmission of forces to the sensor 24 is aided by the fact that the connected portions of the foot 21 and the bridging element are configured such that the bridging element continuously connects the connected portions in the same section, as shown in FIGS. 6(a), (b), and (c) (see also, FIGS. 7, 9, 10, 11, and 18).

There are a number of possibilities for regulating the sensitivity to compression and shear. In particular, it is possible to alter the rigidity of the material forming the foot. It is also possible to alter the choice of the nature of the material forming the bridging element which connects the two bars of the H. For example, a compressible material will make it possible to limit excessive stresses. In addition, it is possible to alter the geometry and size of the bridging element which connects the two bars of the H.

In the particular case in which a sensor 24 of the "nail" type is used (see for example U.S. Pat. No. 6,666,079, which is incorporated herein by reference) and in which the sensitive part 241 of the sensor 24 is located on one of its faces, it is useful to offset the position of the sensor 24 so that the maximum stresses are taken up, as shown in FIG. 7. In FIG. 7(a), the "head" part 242 of the sensor is centered on the bridging element which connects the two bars of the H. In the configuration shown in FIG. 7(b), the sensitive part of the sensor 241 is centered on the bridging element, so that it is subjected to a maximum amount of stress.

Figure 8:
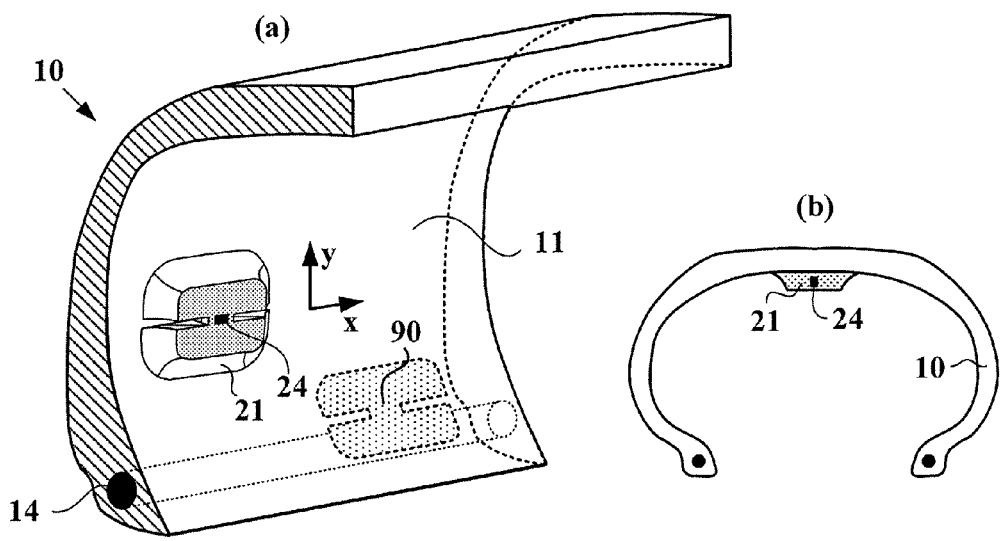
FIG. 8 shows, diagrammatically, possible locations for a patch according to the invention.

According to one embodiment, the foot 21 may be fixed to the sidewall 11 of a tire 10, as shown in FIG. 8(a). In the position shown, the patch is very well protected and is subjected to only minor deformations due largely to the mounting on the rim (not shown). The amplitude of the variations is reduced, and the stress caused by deradialisation of the wheel is quite low. The patch is, however, subjected to relatively substantial flexing about the rim hook.

However, it is also possible to fix the foot 21 radially further inwards, as in the position indicated by the reference numeral 90, or below the crown of the tire 10, as indicated diagrammatically in FIG. 8(b).

Figure 9:
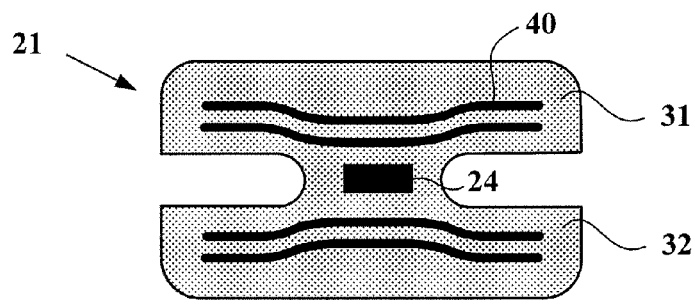

It may be necessary to increase the intensity of forces transmitted to the sensor 24 when the patch is undergoing a shear stress of the xy type; one way of doing this is to modify the characteristics of the bars 31 and 32 of the H to make them less or not at all extensible. FIG. 9 shows by way of example a way of bringing about this embodiment, by including, in the material forming the foot 21, reinforcements 40 which are made of metal or other material. The cords or assemblies of cords 40 greatly reduce the extensibility of the bars 31 and 32 of the H, such that the shearing action on the overall structure at the interface with the tire is applied to the bridging element which connects the two bars 31 and 32 of the H. This shearing action is therefore amplified. The number and type of reinforcements make it possible to proportion this amplifying effect.

Figure 10:
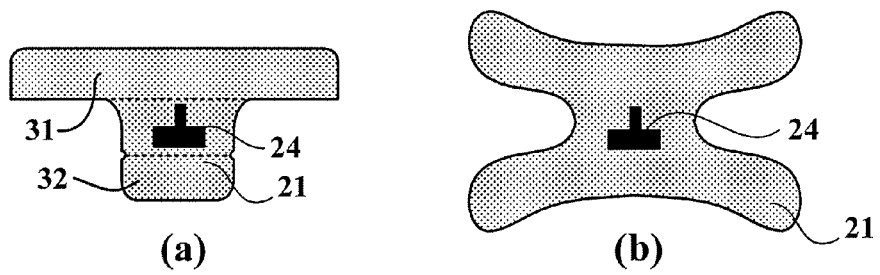

Numerous variants are possible. FIG. 10 shows two variants, with FIG. 10(a) corresponding to an extreme reduction in the length of one of the bars (32) of the H, and FIG. 10(b) corresponding to the use of curved bars to form the H.

FIG. 11 shows a number of variants on the geometry of the foot of a patch according to the invention, and exemplifies the geometric criterion defining a patch according to the invention.

FIG. 11(a) shows an H-shaped foot 21 as described above. It is apparent that the surface area of the section of the bridging element 51 is smaller than the overall surface area between those portions 71 and 81 of the foot which are connected by the bridging element 51—the difference is equal to the surface area of the section 61. In the present case, the surface area of the section of the bridging element 51 is less than about 30% of the overall surface area between those portions of the foot 71 and 81 which are connected by the bridging element 51.

FIG. 11(b) shows a Z-shaped foot 213. Once again, the surface area of the section of the bridging element 53 is smaller than the overall surface area between those portions 73 and 83 of the foot which are connected by the bridging element 53—the difference is equal to the surface area of the section 63.

FIG. 11(c) shows another foot 214 according to the invention. Here, too, the surface area of the section of the bridging element 54 is smaller than the overall surface area between those portions 74 and 84 of the foot which are connected by the bridging element 54—the difference is equal to the surface area of the section 64.

Finally, FIG. 11(d) shows a fourth foot 215 according to the invention. As in the previous cases, the surface area of the section of the bridging element 55 is smaller than the overall surface area between those portions 75 and 85 of the foot which are connected by the bridging element 55; the difference is equal to the surface area of the section 65.

In all the examples shown, except FIG. 10(a), the two portions of the foot which are connected by the bridging element have the same geometry, but this is not a restrictive characteristic of the invention; it is possible to provide portions with different geometries.

Because the foot 21 is fixed to the tire, it is subjected to deformations that the latter undergoes, and therefore the upper part of the foot 21 (i.e., the interface between the foot 21 and the support 22, if there is one) is also subject to deformation. The figures discussed below show different geometries for the support 22, which are configured to prevent the stresses and deformations from being passed on towards the plate 23, with the object of keeping the latter safe.

FIG. 12 shows an embodiment based on a narrowing of the support. The support 221 is designed as a continuation of the foot 21 and has a narrow portion, the size of which allows the level of decoupling between the foot 21 and the plate 23 to be regulated. The narrowing of the support provides a configuration that approaches a single-point contact, which helps avoid the generation of stresses on the plate 23.

The particular geometry of the narrowing has significance. FIG. 13 shows four variants of the section of the narrowing of the support 221 as seen in the plane of section indicated by the line II-II (FIG. 12). The circular section (FIG. 12(a)) and the square section (FIG. 12(c)) are appropriate if there is to be no preferential decoupling direction in the xy plane (i.e., the plane of the section). Furthermore, the circular section shown in FIG. 12(a) allows the same level of decoupling between the parts in all directions in the xy plane. On the other hand, the variants shown in FIGS. 12 (b) and (d) allow a different level of decoupling to be achieved in different directions in the xy plane by appropriate choice of the corresponding proportions.

The geometry of the support is not the only parameter allowing the coupling between the foot 21 and the plate 23 to be modified. It is also possible to modify it through the selection of materials, so that the desired decoupling is achieved. The same material may be used for the support 22 as for the foot 21, or, by contrast, different materials may be used. Of course, the geometrical design must take into account the mechanical characteristics and, in particular, the rigidity of the material used.

The design of the support, i.e., the material and geometry selected, has to take into account the effects associated with the centrifugal action, which put the support under an additional load. In particular, the resonant frequencies of the design have to be considered. Because of the deformations of the tire to which the patch is fixed, the patch is excited on each revolution. The operative life of the support may be reduced if this excitation is sufficient to bring about a free vibration response therein. Ideally, it is therefore recommended to select the geometry and the material such that the first mode of vibration of the support is moved into relatively high frequencies (e.g., 200 Hz). This aspect of the design is within the scope of the person skilled in the art, who may for example make use of a beam model.

If it should prove impossible to avoid a free response in the system, it may be damped by appropriately positioning a part made of damping material in the support. The material used can be selected in order to dissipate the energy within the frequency range corresponding to the free response of the support. For example, FIG. 14 shows a patch 202 using a damping material of this kind. The space left within the support 222 by the narrowing of the section is filled by a damping material 25 of low rigidity, preferably a compressible material, for example a foam.

Considering a patch formed by a foot containing a sensor, a number of scenarios present themselves where an electrical connection between the sensor and the plate is needed. For example, the sensor may have to be connected to processing electronics positioned on the plate, or, if the processing electronics is miniaturized and positioned in the foot, it may be necessary to establish a connection with a power source (e.g., a battery) or an antenna positioned on the plate. These configurations are given by way of example and do not represent any restriction on the invention, and it goes without saying that any other configuration requiring an electrical connection between the foot and the plate is possible.

In this type of configuration, the support must provide the function of an electrical connection between the elements of the foot and those of the plate. The following two embodiments allow the electrical connection to be made by conductive wires, while maintaining the mechanical properties of decoupling.

Figure 15:
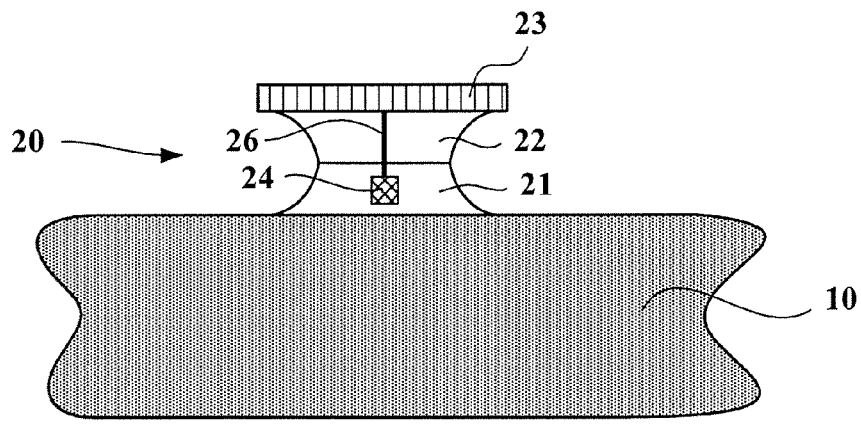

In a first embodiment, shown in FIG. 15, a wired connection 26 is used which is perpendicular to the plate 23 and extends substantially along the central axis of the support 22, that is to say extending through the centre of the section shown in FIG. 13. This configuration is advantageous because the central axis of the support 22 is close to the neutral axis thereof in the event of flexing, the flexing mode being the predominant deformation mode of the support, as a result of its design. Of course, the wire 26 is able to resist this mode of deformation.

Figure 16:
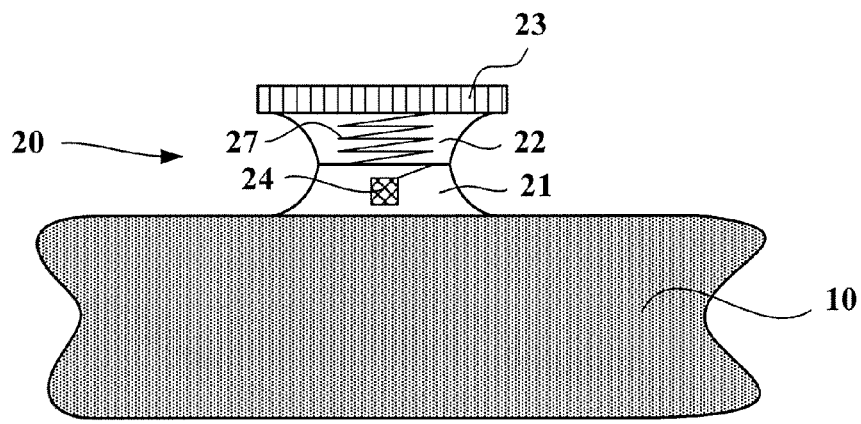

In a second embodiment, shown in FIG. 16, if the support also operates in an extended position, the conductive wire or wires 26 could, in that case, advantageously be replaced by a zigzag or helical shape 27, which can undergo this mode of deformation without suffering from fatigue. For example, the wired connection between the foot 21 and the plate 23 may take the form of a helical shape 27, the axis of which is substantially perpendicular to the plate 23. If a plurality of conductors are required, they may form a plurality of helical shapes offset from one another, or they may be joined together to form a multiple-strand cable which is itself arranged in a helical shape in the support 22.

Figure 17:
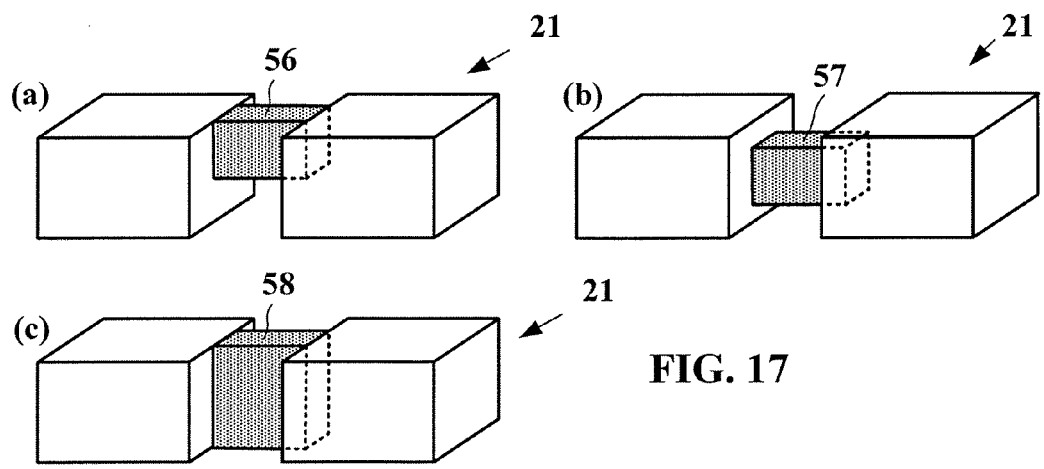
FIG. 17 shows, diagrammatically, perspective views of patches according to the invention.

FIG. 17 shows, diagrammatically, perspective views of patches according to the invention. In particular, it shows the difference between two variants of the geometry of the bridging element.

FIGS. 17($a$) and ($b$) show variants in which the thickness of the bridging element (56 or 57) is less than the thickness of the portions of the foot 21 connected by the bridging element (as measured in a direction perpendicular to the surface of the foot configured to be fixed to the tire). In these variants, the bridging elements 56 and 57 of the H-shaped patches have, in a section (and also in a plurality of sections) parallel to the surface of the foot which is configured to be fixed to the tire, a surface area which is smaller than the overall surface area between those portions of the foot which are connected by the bridging element. In other sections, of course, the bridging element presents no surface area.

FIG. 17($c$) shows a variant in which the bridging element 58 has, in any section which is parallel to the surface of the foot configured to be fixed to the tire, a surface area which is smaller than the overall surface area between those portions of the foot which are connected by the bridging element. This variant has the advantage of being easier to manufacture. The variants shown in FIGS. 17($a$) and ($b$) are more difficult to implement, but allow better control of the stresses undergone by the sensor, which is coupled mechanically to the bridging element.

Figure 18:
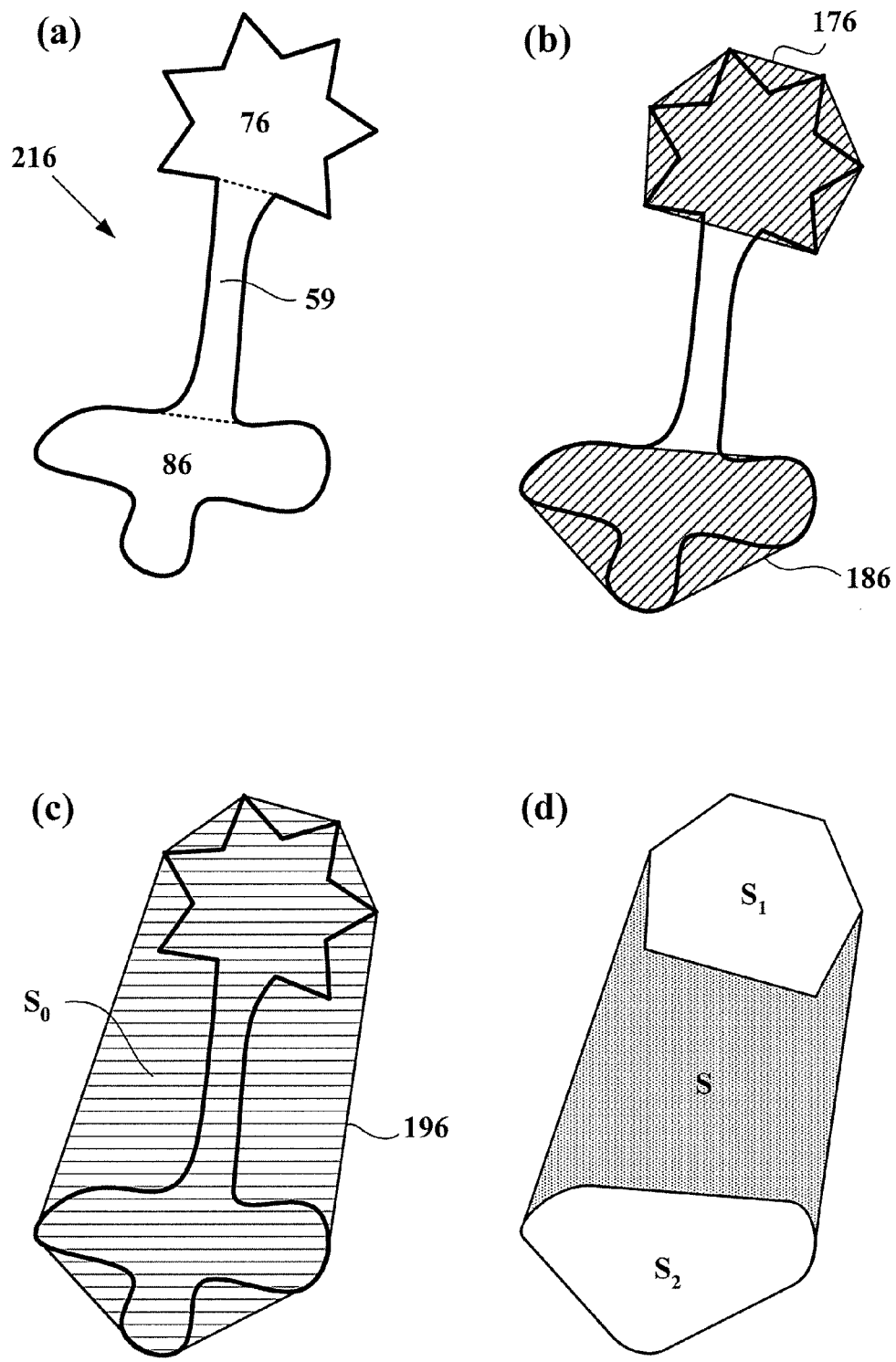
FIG. 18 illustrates how the surface area between the portions of the foot is obtained.

FIG. 18 illustrates how the surface area between the portions of the foot is obtained for complex foot geometries. FIG. 18($a$) represents the foot 216 of a patch in a section which is parallel to the surface of the foot that is configured to be fixed to the tire. In this section, the foot 216 comprises two portions 76 and 86 as well as a bridging element 59 connecting the two portions. For certain geometries, the delimitation of a portion with respect to the bridging element may not be totally clear-cut (e.g. for portion 86). If the geometry of the portion does not obviously suggest a delimitation (as it does for the patches of FIGS. 11($b$), ($c$), and ($d$), but also for portion 76 of FIG. 18($a$)), one may consider the interface between the portion and the bridging element that is defined by a straight line connecting two points of the trace of the foot which have infinite curvature, i.e., points on either side of the bridging element that can be joined by a common tangent line. This is shown, for example, by a dashed line for portion 86.

Once the trace of each portion of the foot in the section has been determined, one determines in a second step, for each of the portions, the trace of the closed loop of minimal length which surrounds the portion. Corresponding loops 176 and 186 are shown in FIG. 18($b$). Each closed loop may be imagined as the trace of a rubber band contracted around the trace of the corresponding portion in the section. The surface area of the surface delimited by loop I is referred to as $S_I$.

Finally, the trace of the closed loop of minimal length which surrounds the foot is determined. The corresponding loop 196 is shown in FIG. 18($c$). This loop 196 delimits a surface of surface area $S_0$. For a foot like the one shown in FIG. 18($a$), where the bridging element connects only two portions, one therefore obtains surface areas definitions such as those shown in FIG. 18($d$).

The surface area S between the portions of the foot can now be obtained by subtraction:

$$S = S_0 - \sum_1 S_1$$

The surface area S between the portions of the foot is then to be compared with the surface area of the bridging element 59. In the example of FIG. 18, the surface area of the bridging element 59 is significantly smaller than the surface area S between the portions of the foot which are connected by the bridging element 59.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A patch configured to fix an electronic system to a tire, the patch comprising a foot with a fixing surface, the fixing surface being configured to be fixed to the tire, the foot including at least two portions connected to one another by at least one bridging element, the bridging element having, in a section that is parallel to the fixing surface, a surface area that is smaller than an overall surface area in a region between the at least two portions of the foot, wherein, in the section, the bridging element continuously connects the at least two portions of the foot.

2. A patch according to claim 1, wherein a maximum height of the bridging element, in a direction perpendicular to the fixing surface, is equal to or less than a maximum height of at least one of the at least two portions of the foot, and a volume of the bridging element is less than an overall volume extending between the at least two portions of the foot.

3. A patch according to claim 1, wherein the surface area of the bridging element in a section that is parallel to the fixing surface is less than about 30% of the overall surface area in the region between the at least two portions of the foot.

4. A patch according to claim 1, wherein a thickness of the bridging element is same as a thickness of the at least two portions of the foot, as measured in a direction perpendicular to the fixing surface.

5. A patch according to claim 1, wherein a thickness of the bridging element is less than a thickness of the at least two portions of the foot, as measured in a direction perpendicular to the fixing surface.

6. A patch according to claim 1, wherein the bridging element has, in any section that is parallel to the fixing surface, a surface area that is greater than zero and smaller than the overall surface area in the region between the at least two portions of the foot.

7. A patch according to claim 6, wherein the surface area of the bridging element in any section parallel to the fixing surface is less than about 30% of the overall surface area in the region between the at least two portions of the foot.

8. A patch according to claim 1, wherein the bridging element, in a section that is parallel to the fixing surface, presents no surface area.

9. A patch according to claim 1, wherein the foot has, in a section that is parallel to the fixing surface an H shape.

10. A patch according to claim 1, wherein the foot has, in a section that is parallel to the fixing surface a Z shape.

11. A patch according to claim 1, wherein the foot is made of a rubber material.

12. A patch according to claim 1, wherein the at least two portions of the foot include reinforcing elements.

13. A patch according to claim 1, further comprising a support that is separate from the foot and that is configured to carry an element of an electronic system, such that there is no direct contact between the foot and the element.

14. A patch according to claim 13, wherein the support includes means for isolating the element of the electronic system from stresses and deformations that the foot undergoes.

15. A patch according to claim 13, wherein the support includes a narrow portion, with respect to a direction perpendicular to the fixing surface, for isolating the element of the electronic system.

16. A patch according to claim 15, wherein a volume surrounding the narrow portion of the support is filled with a low-rigidity compressible material.

17. A patch according to claim 1, wherein, when the patch is fixed to a tire, an angle alpha ($\alpha$) between: (i) an interface surface between the patch and the tire; and (ii) a tangent to a free surface of the foot, the free surface being a surface not fixed to the tire, is less than about 90° at all points on a contour of the interface surface between the patch and the tire.

18. A patch according to claim 1, wherein the patch is incorporated in an assembly that includes an electronic system with a sensor, the sensor being coupled mechanically to the bridging element of the foot of the patch.

19. A patch according to claim 18, wherein the electronic system further includes a second element in addition to the sensor, wherein the patch has an axis of symmetry perpendicular to the fixing surface, and wherein an electrical connection between the sensor and the second element of the electronic system is provided by a conductive wire extending substantially along the axis of symmetry.

20. A patch according to claim 18, wherein the electronic system further includes a second element in addition to the sensor, wherein the patch has an axis of symmetry perpendicular to the fixing surface, and wherein an electrical connection between the sensor and the second element of the electronic system is provided by an extensible conductor centered on the axis of symmetry.

21. A patch according to claims 18, wherein the sensor allows normal stresses and/or shear stresses to be measured in three directions.

22. A patch according to claim 18, wherein the assembly is incorporated in a tire.

* * * * *